United States Patent
Ho et al.

(10) Patent No.: US 7,161,763 B2
(45) Date of Patent: Jan. 9, 2007

(54) GMR SENSOR WITH ORIENTED HARD BIAS STABILIZATION

(75) Inventors: Kuok San Ho, Santa Clara, CA (US); Prakash Kasiraj, San Jose, CA (US); Ernesto E. Marinero, Saratoga, CA (US); James L. Nix, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 562 days.

(21) Appl. No.: 10/782,088

(22) Filed: Feb. 18, 2004

(65) Prior Publication Data

US 2005/0180062 A1    Aug. 18, 2005

(51) Int. Cl.
G11B 17/02   (2006.01)

(52) U.S. Cl. .................................... 360/97.02

(58) Field of Classification Search ........ None
See application file for complete search history.

(56) References Cited

U.S. PATENT DOCUMENTS

| | | | | |
|---|---|---|---|---|
| 5,478,411 A * | 12/1995 | Coey et al. | ................ | 148/122 |
| 5,859,754 A * | 1/1999 | Tong et al. | ................ | 360/314 |
| 6,023,395 A | 2/2000 | Dill et al. | ................ | 360/113 |
| 6,157,526 A * | 12/2000 | Watanabe et al. | ...... | 360/324.12 |
| 6,185,081 B1 | 2/2001 | Simion et al. | ........ | 360/327.3 |
| 6,351,357 B1 | 2/2002 | Xue et al. | .............. | 360/327.31 |
| 6,400,536 B1 * | 6/2002 | Gill | ................ | 360/324.12 |
| 6,473,279 B1 | 10/2002 | Smith et al. | ......... | 360/324.12 |
| 6,500,570 B1 * | 12/2002 | Hasegawa et al. | ...... | 428/811.2 |
| 6,525,911 B1 * | 2/2003 | Gill | ................ | 360/319 |
| 6,577,477 B1 | 6/2003 | Lin | ................ | 360/324.12 |
| 6,765,819 B1 * | 7/2004 | Bhattacharyya et al. | .... | 365/158 |
| 6,866,751 B1 * | 3/2005 | Gill et al. | ........... | 204/192.2 |
| 6,947,264 B1 * | 9/2005 | Gill | ................ | 360/324.2 |
| 7,061,731 B1 * | 6/2006 | Larson et al. | ........ | 360/324.12 |
| 2003/0048585 A1 | 3/2003 | Gill | ................ | 360/324.12 |
| 2003/0072110 A1 * | 4/2003 | Dee | ................ | 360/324.12 |
| 2005/0180064 A1 * | 8/2005 | Cyrille et al. | ........ | 360/327.3 |

FOREIGN PATENT DOCUMENTS

| | | | |
|---|---|---|---|
| JP | 405314431 A | * | 11/1993 |
| JP | 411288504 A | * | 10/1999 |

* cited by examiner

Primary Examiner—Allen Cao
(74) Attorney, Agent, or Firm—Lumen IP Services; Thomas R. Berthold (57) ABSTRACT

Magnetic data storage devices use read/write heads to transfer data between the magnetic storage medium and the rest of the system. The read head is constructed with a magnetic layer called a free layer whose magnetic axis rotates based upon external magnetic influences of the magnetic storage medium. The free layer is biased into a predetermined magnetic orientation with the magnetic influence of a layer called a hard bias layer. Orientation of magnetic axes within the hard bias layer is desired. This document describes a hard bias layer whose magnetization exhibits uniaxial magnetic anisotropy.

15 Claims, 10 Drawing Sheets

GMR SENSOR WITH ORIENTED HARD BIAS STABILIZATION

FIELD

The invention relates to magnetic read heads, and more specifically to magnetically oriented hard bias layers in the read heads.

BACKGROUND

Many electronic devices such as computers, VCR's, and digital cameras use magnetic storage as a form of nonvolatile memory. Different methods of magnetic storage include magnetic tape (used in VCR's and digital backup tapes for example) and rigid magnetic media (used in hard disk drives for example). The read portion of the read/write head used in magnetic storage devices generally use the principle of magnetoresistance and can be constructed in a variety of ways. Anisotropic magnetoresistance (AMR), giant magnetoresistance (GMR), and magnetic tunnel junction (MTJ) read sensors can all be used as magnetic read sensors and are well known in the art.

Figure 1:
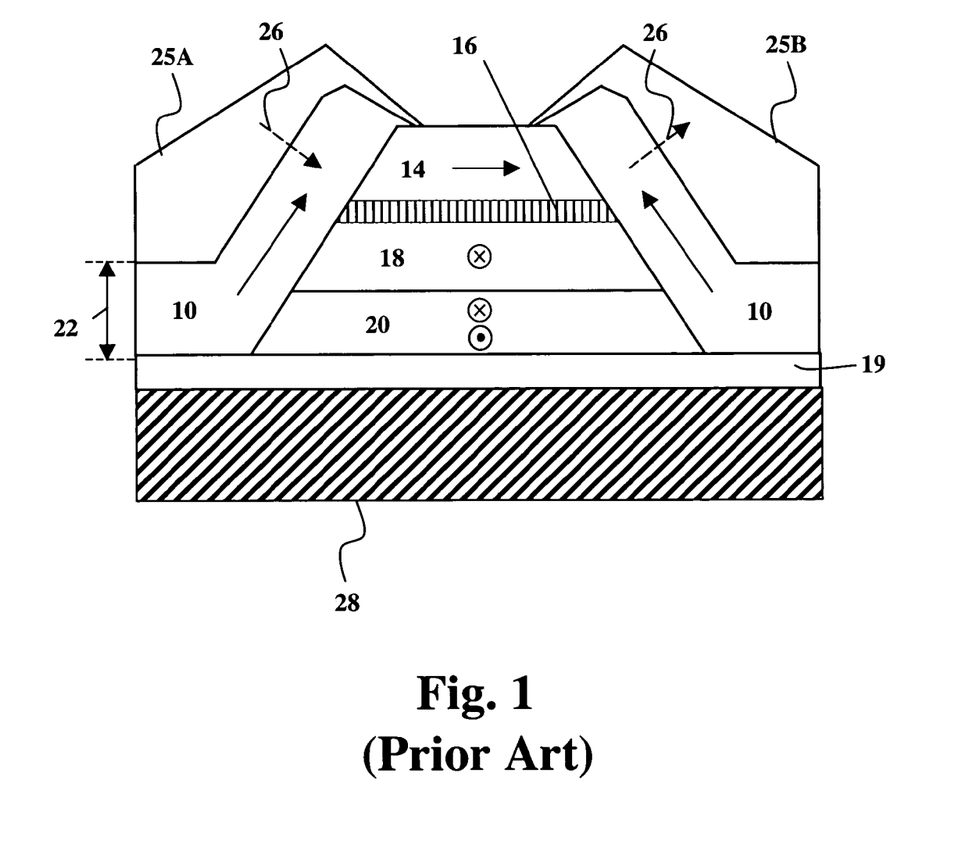
FIG. 1 shows an example of a prior art GMR sensor.

FIG. 1 shows a prior art GMR sensor. The hard bias layer 10 has a thickness 22 and may be made out of materials such as CoPtCr. A ferromagnetic free layer 14, usually made of NiFe, is on top of a nonmagnetic metallic layer 16, usually made of Cu. Under the metallic layer 16 is a ferromagnetic pinned layer 18, which has a magnetic orientation that is pinned by an antiferromagnetic layer 20. The ferromagnetic pinned layer 18 is usually made of CoFe. The antiferromagnetic layer 20 is usually made of PtMn. Under both the hard bias layer 10 and antiferromagnetic layer 20 is a dielectric gap layer 19 followed by the substrate 28. The substrate 28 is usually made of an alloy of $Al_2O_3$—TiC composite (N-58). Electric current 26 flows from electrode 25A through the read sensor along the plane of the free layer 14 to electrode 25B, and, therefore, the sensor is referred to as a current-in-plane (CIP) sensor. Suitable materials for the electrodes 25 A,B include Rh and Au. Changing the magnetic orientation of the free layer 14 by exposing the read sensor to a magnetic media changes the resistance to current 26 flowing through the read sensor. Data on the magnetic media can be read by detecting changes in current 26 flow as the read sensor passes over the magnetic media.

Figure 2:
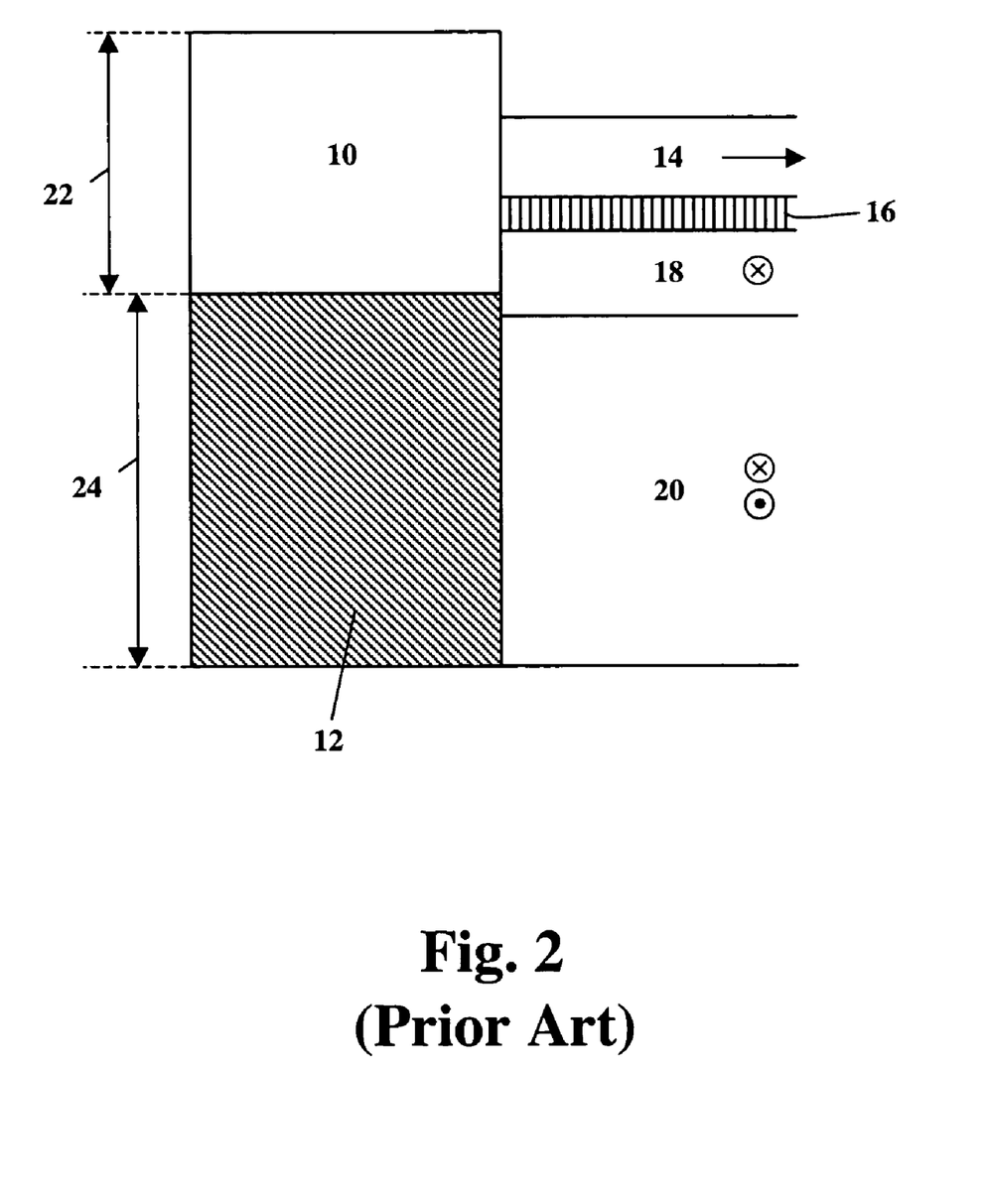
FIG. 2 shows an example of a prior art UCJ sensor.

FIG. 2 shows one half a prior art ultra contiguous junction (UCJ) magnetic read sensor. The UCJ sensor has a hard bias layer 10 with a thickness 22 that is positioned such that its geometrical center is collinear with a ferromagnetic free layer 14. The hard bias layer 10 is grown on a seed layer 12 that has a thickness 24. The ferromagnetic free layer 14 is next to a nonmagnetic metallic layer 16. An antiferromagnetic layer 20 determines the magnetic orientation of the ferromagnetic pinned layer 18. The seed layer 12 and antiferromagnetic layer 20 are built on a dielectric gap layer, which is in contact with substrate. Both the dielectric gap layer and substrate are not shown but are well known in the art. The UCJ geometry is desirable to further increase the storage density of magnetic recording devices. As the bit size area is decreased in order to increase the areal density, the free layer 14 dimensions need to be reduced to match the size of the recorded magnetic domains. Furthermore, for optimum stabilization of the free layer by the hard bias layer, the ratio and thus the physical thicknesses of these two layers need to be similar. Hence, the UCJ geometry readily allows matching of the physical dimensions of the hard bias and the free layers in the magnetic read sensor.

The hard bias layer 10 orients the magnetic axis of the free layer 14 when the free layer 14 is not subject to an external magnetic field that would come from the magnetic flux from the magnetic recording media, which the magnetic read sensor would detect when the read head flies over the magnetic media. Failure to provide a biasing structure such as a hard bias layer 10 can result in Barkhausen noise. Barkhausen noise reduces the signal to noise ratio of the read sensor and makes it difficult to increase the storage density on the magnetic media. Inadequate biasing can also result from local variations of the magnetization direction at the junction between the hard bias layer 10 and the free layer 14. These variations may result in head instability, current amplitude changes, and non-reproducible performance from device to device.

Magnetic heads used for ultrahigh density magnetic storage are more susceptible to biasing problems, because ultrahigh density magnetic heads use of very thin hard bias layers 10. Consequently, for very thin hard bias layers 10, there are a very limited number of magnetic grains at the junction between the hard bias layer 10 and the free layer 14.

Materials utilized for read sensors are polycrystalline in nature. Therefore, the magnetization direction of the individual grains can differ from grain to grain. This can result in magnetically unstable heads. The problem is further exacerbated by the superparamagnetic effect, whereby the magnetic orientation of progressively smaller magnetic grains can be randomized by thermal fluctuations.

Biasing layers currently used in recording devices exhibit, at best, two dimensional random orientation of the magnetization of the individual crystallites. The degree of alignment in the hard bias layer 10 is increased by employing an external setting field. However, due to the aforementioned thermal and microstructural effects, the magnetization direction, upon removal of the setting field, can significantly relax from the desired orientation. This is particularly detrimental for the grains at the boundary between the hard bias 10 and the free layer 14.

Figure 3A:
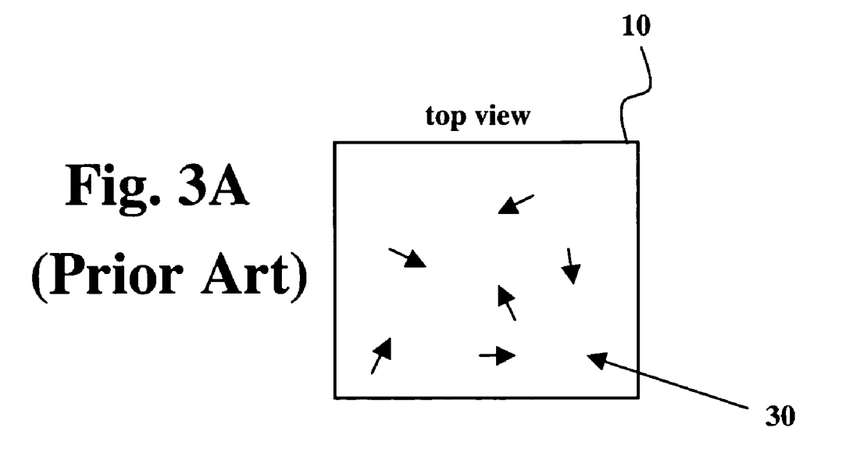
FIGS. 3A, B show a prior art example of two dimensional magnetic orientation.
Figure 3B:
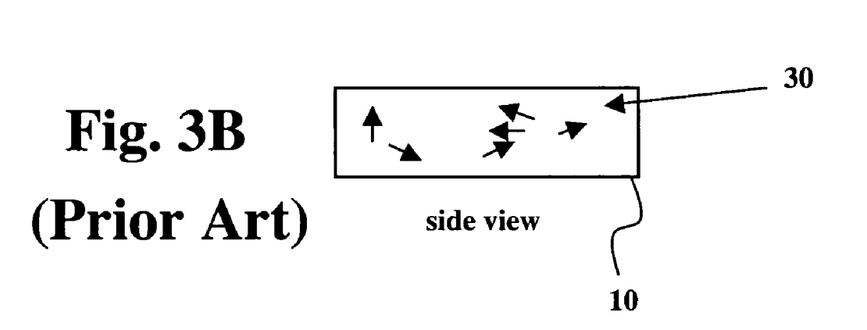

FIGS. 3A and B show an example of two dimensional random orientation of the magnetic axes of the grains in the hard bias layer 10. FIG. 3A shows a top view of a hard bias layer 10 with magnetic axes 30 of grains that are randomly oriented relative to the normal of the thin film plane comprising the hard bias layer 10. FIG. 3B shows a side view of the hard bias layer 10 of FIG. 3A. The side view shows that the net magnetization of the thin film is predominantly parallel to the film plane. However, as shown in FIG. 3A, the magnetic axes 30 of grains can vary from canted to perpendicular as seen in the top view. To achieve full confinement of the magnetization in the plane of the hard bias materials is not easily accomplished.

While current magnetic read heads typically have only two dimensional random orientation of the magnetization of the individual crystallites, magnetic recording media (a hard disk for example) can be manufactured such it exhibits uniaxial magnetic anisotropy (commonly known as magnetic "Orientation"). "Orientation" is accomplished when suitable growth conditions are employed so that the crystallites comprising the magnetic material exhibit a strong orientation of their magnetic axis along the desired direction.

Figure 4:
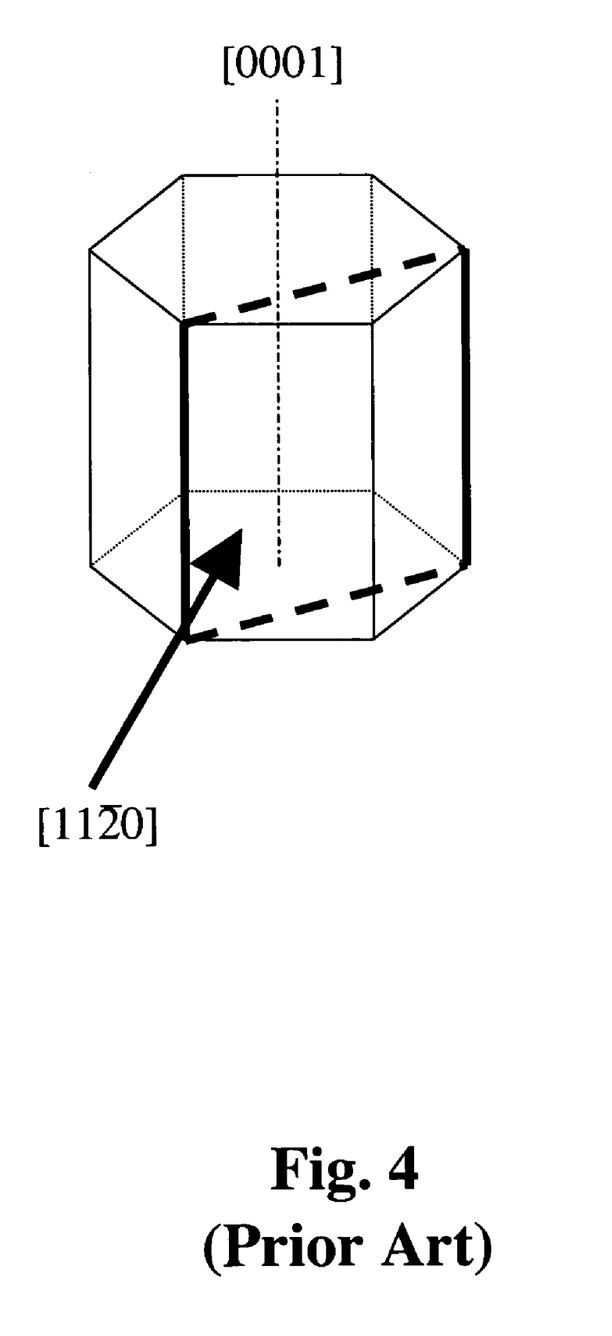
FIG. 4 shows a HCP crystal structure.

FIG. 4 shows an example of a hexagonal close pack (HCP) cell with the [11$\bar{2}$0] plane indicated with dashed lines. In the case of HCP Co-alloys, the magnetic axes of the crystallites are parallel to the plane that is orthogonal to the basal planes of the hexagonal unit cell (i.e. the magnetic axes are parallel to the [11$\bar{2}$0] plane).

Figure 5:
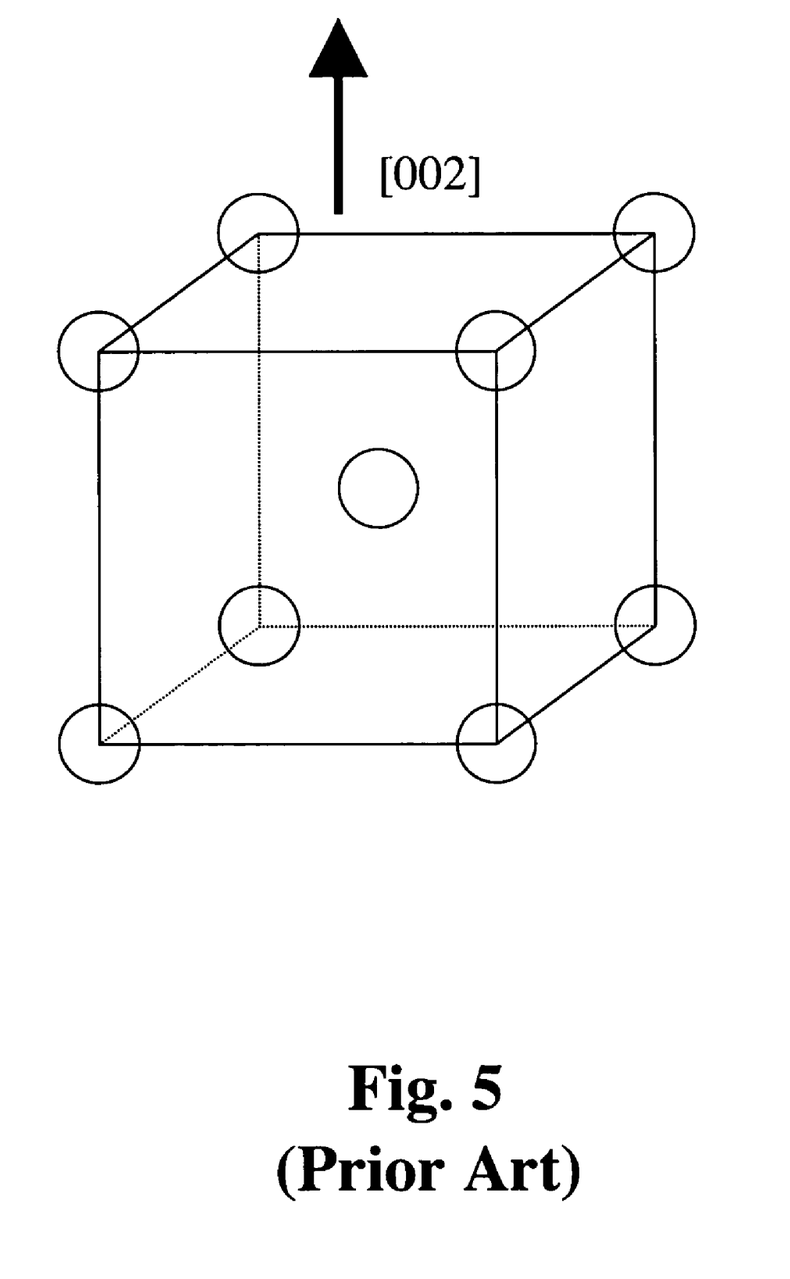
FIG. 5 shows a BCC crystal structure.

FIG. 5 shows an example of a body centered cubic (BCC) crystalline structure. Atoms reside at each corner of the cube and also in the middle of the cube.

In magnetic media, "Orientation" is typically achieved by growing the magnetic alloy on suitable underlayers grown in turn on substrates which are circumferentially textured. U.S. Pat. No. 5,989,674 describes the influence that a textured substrate has on the growth of an underlayer structure. When deposited on a properly textured substrate, the lattice parameters of the BCC Cr and Cr-alloys along the radial direction are greater than the corresponding lattice parameters along the track direction. This anisotropic strain relaxation leads to a better lattice match of the [11$\bar{2}$0] prismatic plane of the HCP Co-alloy, which is deposited on top of the underlayer, along the track direction. Consequently, the magnetic axis of a crystallite predominantly aligns along the track direction. "Orientation" requires that the Co-alloy crystallites grow with their [11$\bar{2}$0] plane parallel to the substrate. To ensure this, the underlayer material is grown with its [002] plane parallel to the substrate plane.

Figure 6:
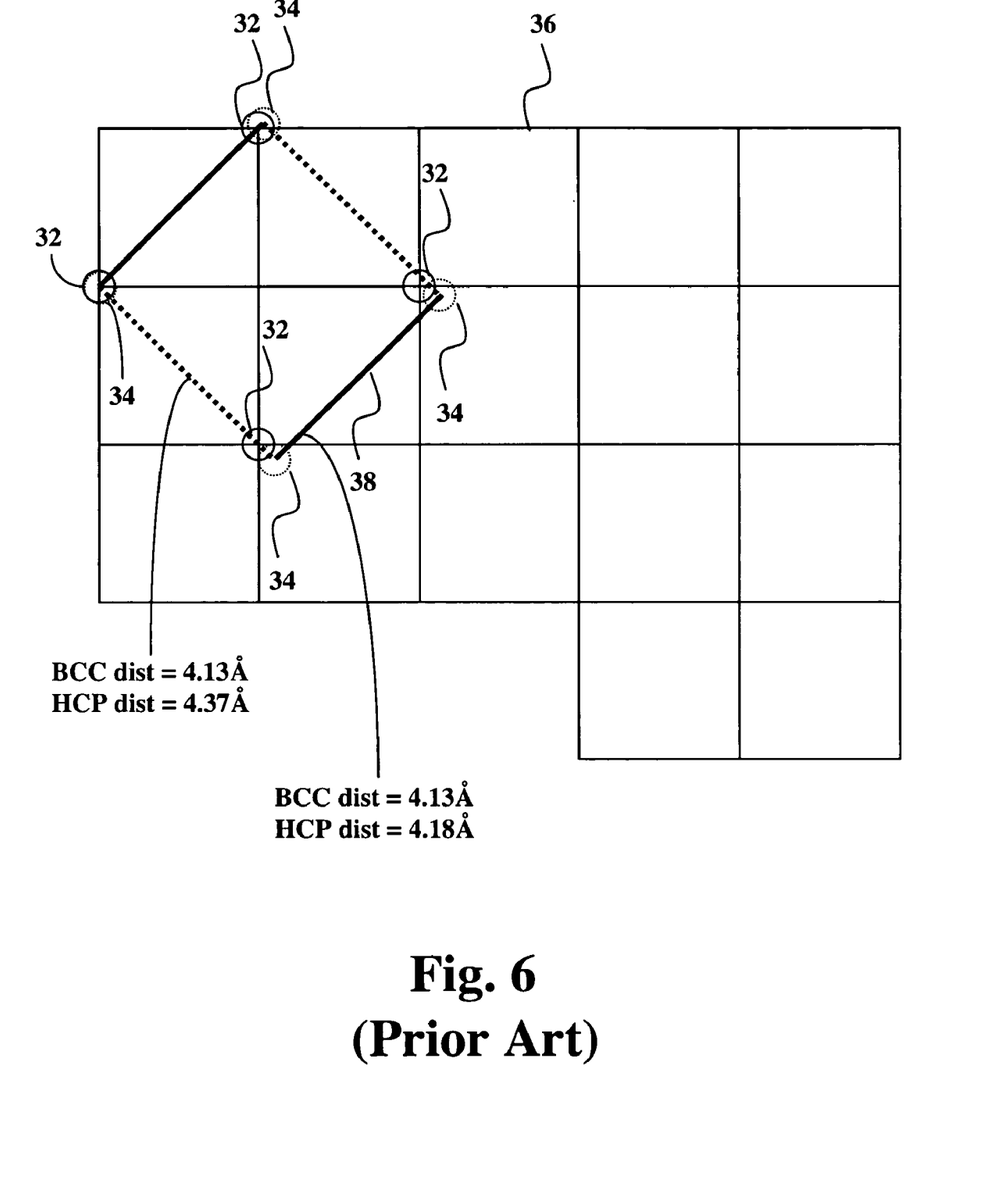
FIG. 6 shows an example of the epitaxial relationship between BCC and HCP crystals.

FIG. 6 shows an example of the epitaxial relationships between a HCP magnetic layer and a BCC CrMo layer. BCC atoms 32 are shown on a BCC lattice 36. The [002] plane is shown parallel to the page. The four BCC atoms 32 are not from one crystalline cell, but rather are from specific corners of four adjoining BCC cells. Four HCP atoms 34 comprise the [11$\bar{2}$0] plane 38 of the HCP structure.

Current methods in recording media manufacturing to render the underlayer [002] plane parallel to the film plane use high temperature growth (typically greater than 200° C.) and sputter deposition. High temperature growth is not always desirable or possible for the fabrication of magnetic read sensors. Currently, high temperature growth will damage other components of the read head, if attempted. Thus, current methods of underlayer and bias layer growth are not suitable for the creation of uniaxial magnetic anisotropy in magnetic read heads.

Given the need for ever increasing storage densities, there is a need to increase the magnetic thermal stability and degree of orientation of the magnetization in hard bias materials for high density recording.

SUMMARY

This document describes a structure with a hard bias layer 10 that exhibits uniaxial magnetic anisotropy. The grains of the hard bias layer 10 have their magnetic axes generally oriented along an axis that is parallel to and confined to the thin film plane of the hard bias layer 10.

A hard bias layer 10 that exhibits uniaxial magnetic anisotropy can be fabricated by first depositing a seed layer 12 on a substrate at a first angle of incidence. The hard bias layer 10 is then deposited on top of the seed layer 12 at a second angle of incidence.

DESCRIPTION

While seed layers 12 and hard bias layers 10 have been created in the past using ion beam deposition, an unexpected result of uniaxial magnetic anisotropy in the hard bias layer 10 results from depositing the seed layer 12 and the hard bias layer 10 at different and significantly higher angles of incidence than typically used. If the angles of incidence during deposition are the same for the seed layer 12 and hard bias layer 10, there is no uniaxial magnetic anisotropy in the hard bias layer 10. In order to achieve magnetic anisotropy, the substrate 28 is not normally rotated during film growth. However, in order to improve film uniformity, a small back and forth rotation on the order of ±20° about an axis normal to the substrate may be desirable. Maximum anisotropy is attained by separately optimizing the angles of incidence for the seed and the hard bias layers 12, 10. The term substrate in this description is intended to include both a bare substrate commonly known in the industry (made, for example, of $Al_2O_3$—TiC composite (N-58)) and a bare substrate with magnetic and/or non-magnetic layers deposited on the bare substrate before any seed or hard bias layers 12, 10 are deposited. For example, a substrate may mean a bare substrate with a dielectric gap layer deposited on the surface.

A high angle of incidence deposition (i.e. ≧30 degrees) of the hard bias and seed layers 10, 14 is employed to produce uniaxial anisotropy in the hard bias layer 10. In contrast, current art hard bias deposition employing ion beam growth technology employ angles between 10–20 degrees with respect to the normal of the film plane. Ion beam deposition has been successful in experimental trials. It is possible that other vapor phase growth methods can be employed as long as the particle flux direction is well defined. It is surmised that the orientation in the hard bias layer 10 originates from the anisotropic growth of the seed layer 12 which is induced by the ion beam directionality and growth geometry. Therefore, when the lattice plane is viewed from the normal direction, the atomic arrangement in the seed layer 12 is anisotropic. Consequently, when the hard bias layer 10 is grown at a shallower angle, the degree of lattice matching for the HCP Co-alloy [11$\bar{2}$0] plane is favored along the beam direction, thus producing uniaxial magnetic anisotropy.

Figure 7:
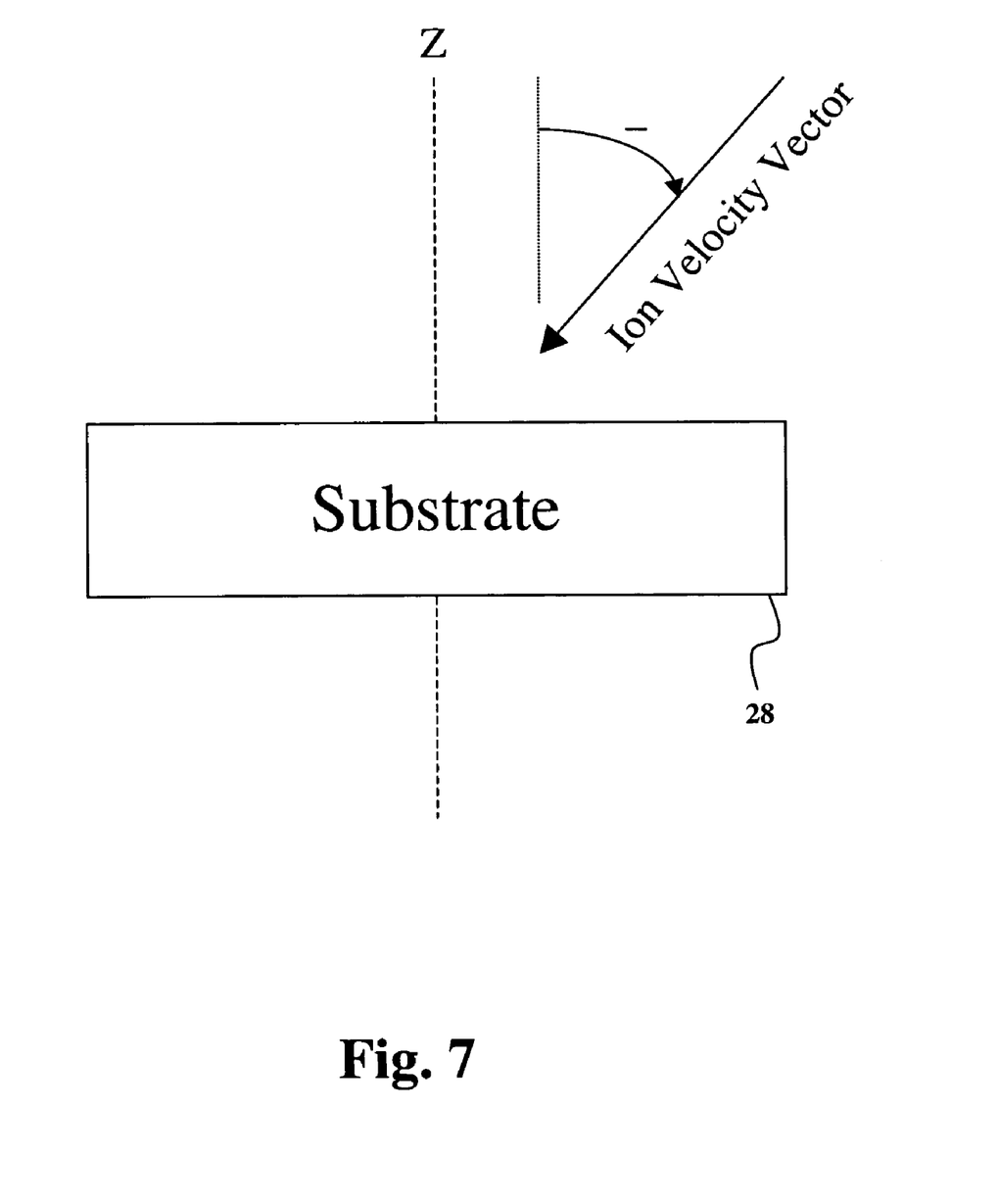
FIG. 7 shows the angle of incidence of ions relative to a substrate.

FIG. 7 shows an ion velocity vector at an angle α relative to a vertical axis Z. The angle α can be adjusted depending on the type of machinery used for ion deposition. Angle α represents the angle of incidence of the ion velocity vector relative to the normal of the substrate 28.

Figure 8:
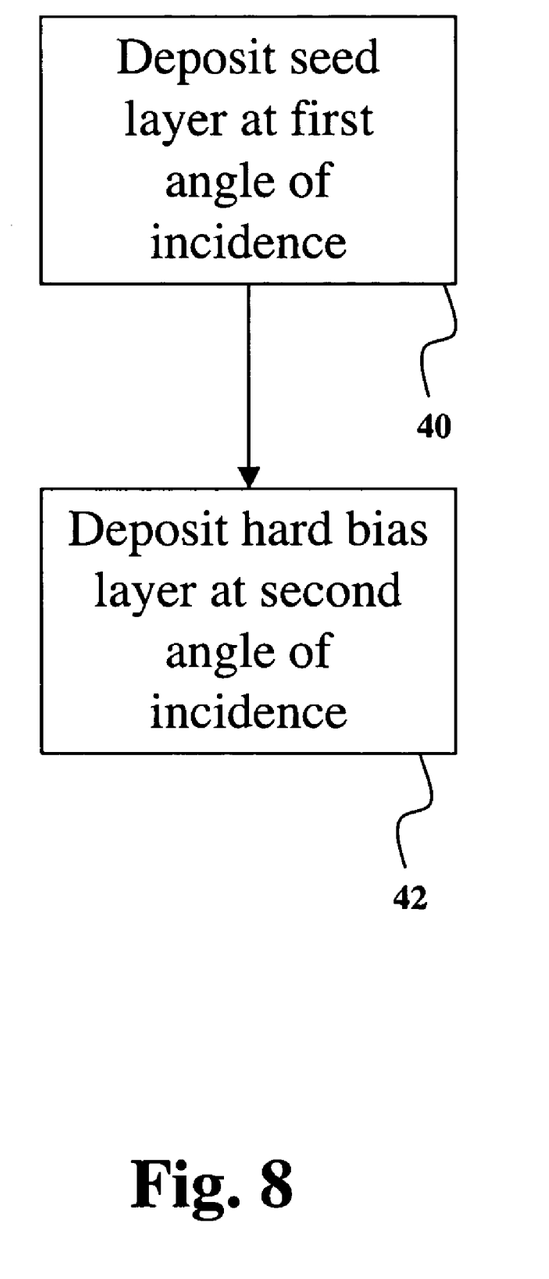
FIG. 8 shows a flow chart of how to deposit seed and hard bias layers.

FIG. 8 shows a flow chart of the process of creating an oriented hard bias layer 10 that exhibits uniaxial magnetic anisotropy. In 40 the seed layer 12 is deposited at a first angle of incidence. In 42 the hard bias layer 10 is deposited at a second angle of incidence. An ion deposition machine from Veeco of Woodbury, N.Y. is suitable for the seed layer 12 and hard bias layer 10 creation. Other film growth techniques, such as sputtering, should also be acceptable in place of ion beam deposition.

One example of suitable deposition angles for the seed layer 12 and hard bias layer 10 are 65 degrees and 40 degrees respectively. These angles are measured from the normal of the plane that is being grown to the ion velocity vector near the surface of the film plane. The angular range to achieve the highest orientation is about plus or minus 5 degrees. Of course, depending on the type of deposition equipment used, materials used, and conditions employed, different deposition angles may be more appropriate for optimum results.

Figure 9:
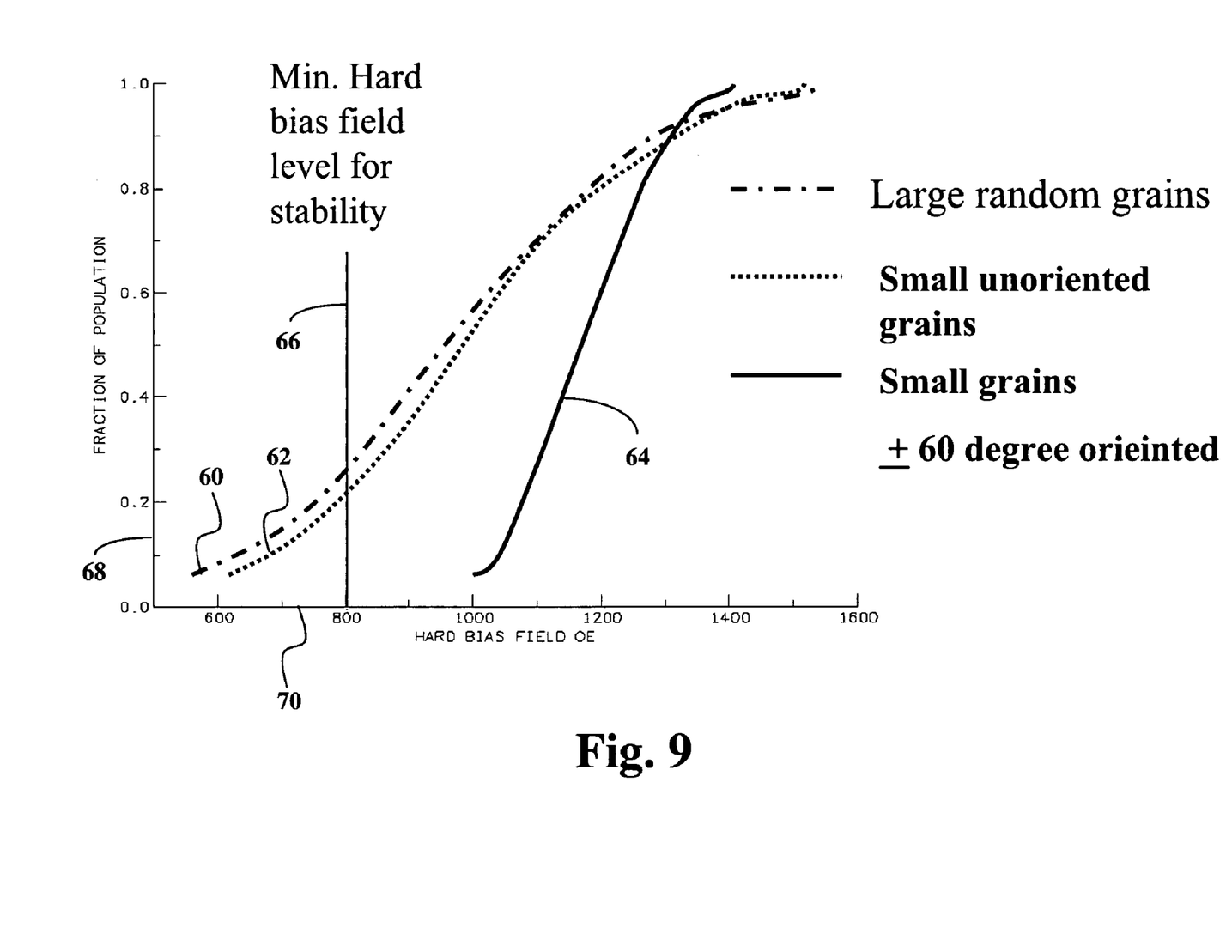
FIG. 9 shows the results of an example of a Monte Carlo study on hard bias granular magnetic axis orientation.

FIG. 9 shows a plot of a Monte Carlo study showing the relationship between orientation and bias field in a read sensor device. This shows the results of micromagnetic modeling using Monte Carlo calculations of the magnitude of the bias field at the UCJ junction as a function of various properties of the hard bias layer. The y-axis 68 gives the fraction of the device population showing a certain magnitude of the bias field (x-axis 70). Three cases of hard bias layers are considered: 1) hard bias with large randomly magnetized grains 60, 2) hard bias with small non-oriented grains 62, and 3) hard bias with small grains and +/−60 degree orientation 64. The plot also shows the minimum hard bias field 66 (~800 Oe) required to achieve device stability. It is clear from the figure that changes in grain size with no orientation make little differences to the resulting distribution of the bias field. In contrast, orientation, even a modest amount, leads to a strong narrowing of the population distribution. It should be noted that no device in the oriented population falls below the critical bias field required for stability.

Figure 10A:
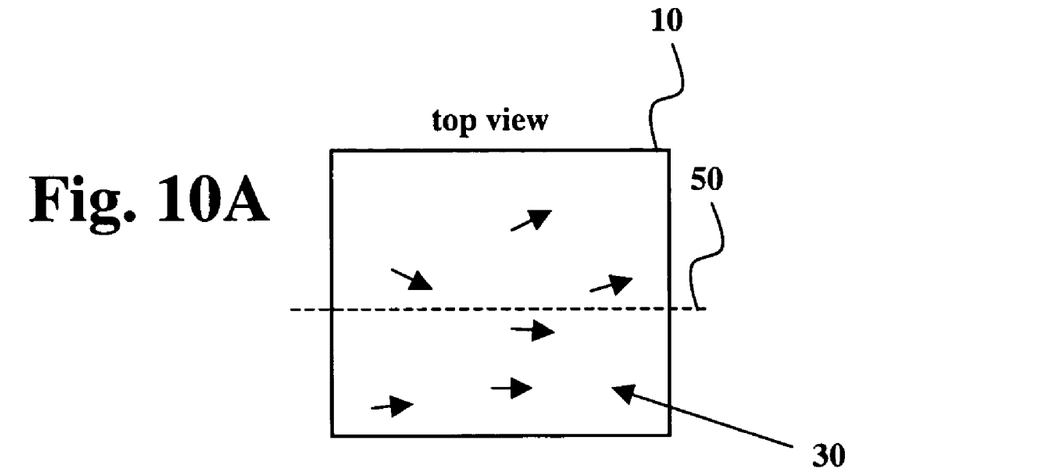
FIGS. 10A, B show an example of uniaxial magnetic anisotropy.
Figure 10B:
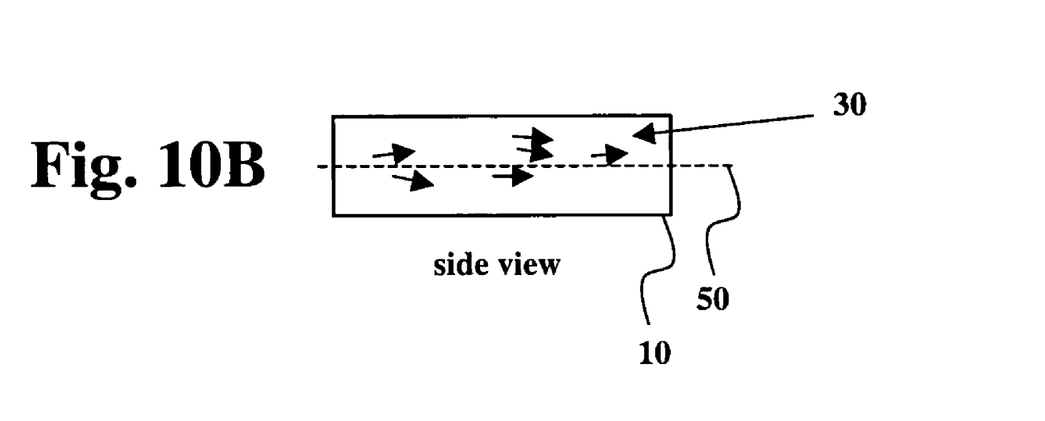

FIGS. 10A,B show an example of uniaxial magnetic anisotropy in the hard bias layer 10. FIG. 10A shows a top view of an exemplary hard bias layer 10 with magnetic axes 30 of grains that are oriented relative to an axis 50 that is parallel to and confined to the thin film plane of the hard bias layer 10. The axes 30 of the grains can be oriented within 60 degrees of the axis 50 using the above mentioned method of creating seed and hard bias layers 10, 12. FIG. 10B shows a side view of the hard bias layer 10 of FIG. 10A. The side view shows that the magnetic axes 30 of grains are oriented within 60 degrees of the axis 50. A higher degree of orientation can be expected by further improvements in growth conditions.

In addition to being useful in UCJ read sensors, the above mentioned process of creating a hard bias layer that exhibits uniaxial magnetic anisotropy can be used in other magnetic devices requiring a biasing layer to orient the magnetization of ancillary magnetic layers requiring uniaxial anisotropy. Examples of suitable devices include MTJ's and current perpendicular to plane (CPP) GMR heads.

It will be apparent to one skilled in the art that the described embodiments may be altered in many ways without departing from the spirit and scope of the invention. Accordingly, the scope of the invention should be determined by the following claims and their equivalents.

What is claimed is:

1. A system comprising:
a substrate;
a seed layer; and
a hard bias layer comprising a thin film of ferromagnetic hexagonal close pack material, wherein magnetization of the hard bias layer exhibits uniaxial magnetic anisotropy and the magnetic axes of grains in the hard bias layer comprise c-axes oriented within ±60 degrees with respect to a linear axis, the linear axis being parallel to the thin film.

2. A method of manufacturing a magnetic read head hard bias layer and seed layer comprising:
depositing a seed layer on a substrate, wherein seed layer ions have a first angle of incidence with respect to a normal of the substrate; and
depositing a hard bias layer on the seed layer, wherein hard bias layer ions have a second angle of incidence with respect to the normal of the substrate, wherein magnetization of the deposited hard bias layer exhibits uniaxial magnetic anisotropy.

3. The method of claim 2, wherein the first angle of incidence is greater than or equal to 30 degrees.

4. The method of claim 2, wherein the second angle of incidence is greater than or equal to 30 degrees.

5. The method of claim 2, wherein the first angle of incidence is different from the second angle of incidence.

6. The method of claim 5, wherein the first angle of incidence is greater than the second angle of incidence.

7. The method of claim 5, wherein the first angle of incidence is between 60 and 70 degrees.

8. The method of claim 5, wherein the second angle of incidence is between 35 and 45 degrees.

9. The method of claim 2, wherein the substrate is not rotated during deposition of both the seed layer and the hard bias layer.

10. The method of claim 2, wherein the substrate is rotated up to ±20 degrees relative to the normal during layer growth.

11. The method of claim 2, wherein the hard bias layer comprises a thin film, wherein magnetic axes of deposited grains of the hard bias layer are oriented within ±60 degrees with respect to a linear axis that is parallel to the thin film.

12. A magnetic read sensor comprising:
a substrate;
a free layer;
a hard bias layer comprising a ferromagnetic hexagonal close pack material, wherein grains of the hard bias layer have uniaxial magnetic anisotropy and the c-axes of the grains are oriented within ±60 degrees with respect to an in-plane axis; and
a seed layer for the hard bias layer.

13. The sensor of claim 12, wherein the seed layer has a thickness of at least 10 angstroms.

14. The sensor of claim 12, further comprising:
an antiferromagnetic layer;
a high coercivity ferromagnetic pinned layer; and
a non-magnetic metallic layer.

15. The sensor of claim 14, wherein the sensor comprises an ultra contiguous junction read sensor.

* * * * *